(12) United States Patent
Manabe et al.

(10) Patent No.: US 8,603,689 B2
(45) Date of Patent: Dec. 10, 2013

(54) FUEL CELL SYSTEM WHICH MEASURES IMPEDANCE

(75) Inventors: Kota Manabe, Toyota (JP); Nobuyuki Orihashi, Toyota (JP); Shigetaka Hamada, Toyota (JP); Masahiro Shige, Kaizuka (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 1060 days.

(21) Appl. No.: 11/922,892

(22) PCT Filed: Jun. 30, 2006

(86) PCT No.: PCT/JP2006/313516
§ 371 (c)(1),
(2), (4) Date: Dec. 26, 2007

(87) PCT Pub. No.: WO2007/004702
PCT Pub. Date: Jan. 11, 2007

(65) Prior Publication Data
US 2009/0110985 A1    Apr. 30, 2009

(30) Foreign Application Priority Data

Jun. 30, 2005  (JP) .................................. 2005-191397

(51) Int. Cl.
*H01M 8/04* (2006.01)
(52) U.S. Cl.
USPC .............. 429/430; 429/428; 324/602; 702/65
(58) Field of Classification Search
USPC .................. 429/428–432, 443, 444; 324/602; 702/65
See application file for complete search history.

(56) References Cited

U.S. PATENT DOCUMENTS

| 6,376,110 | B1 * | 4/2002 | Koschany ..................... 429/413 |
| 6,519,539 | B1 | 2/2003 | Freeman et al. |

(Continued)

FOREIGN PATENT DOCUMENTS

| CN | 1466689 | A |   | 1/2004 | |
| CN | 1793882 | A | * | 6/2006 | ............. G01N 27/12 |
| JP | 59215674 | A | * | 12/1984 | ............. H01M 8/04 |
| JP | 2002-367650 | A |   | 12/2002 | |
| JP | 2003-86220 | A |   | 3/2003 | |
| JP | 2004-509446 | A |   | 3/2004 | |

(Continued)

OTHER PUBLICATIONS

Machine translation for Pei, CN 1793882 A.*

*Primary Examiner* — Edu E Enin-Okut
(74) *Attorney, Agent, or Firm* — Kenyon & Kenyon LLP (57) ABSTRACT

A fuel cell system according to the present invention is characterized by comprising a measurement unit which measures an impedance of a fuel cell in a predetermined frequency region, and a regulation unit which regulates an amount of a gas to be supplied to the fuel cell based on a measured value of the impedance in the predetermined frequency region. According to such a constitution, the impedance of the fuel cell in the predetermined frequency region (e.g., a low frequency region) is measured, and the amount of the gas (e.g., an amount of an oxidizing gas) to be supplied to the fuel cell is regulated based on this measured value of the impedance. Here, since the impedance of the fuel cell in the predetermined frequency region largely differs with a fuel supply state (see FIG. 2), the amount of the gas to be supplied to the fuel cell can be regulated based on the measured value of the impedance to realize a highly efficient and stable operation.

6 Claims, 5 Drawing Sheets

(56) References Cited

U.S. PATENT DOCUMENTS

| | | |
|---|---|---|
| 2004/0091759 A1* | 5/2004 | Harrington et al. ............. 429/22 |
| 2004/0151956 A1 | 8/2004 | Orihashi et al. |
| 2004/0214061 A1* | 10/2004 | Sugiura et al. ................. 429/23 |
| 2004/0214062 A1* | 10/2004 | Tajiri et al. ..................... 429/25 |
| 2005/0048336 A1* | 3/2005 | Takebe et al. ................... 429/22 |
| 2005/0287402 A1* | 12/2005 | Maly et al. ...................... 429/13 |
| 2006/0074574 A1* | 4/2006 | Gasda et al. .................... 702/63 |

FOREIGN PATENT DOCUMENTS

| | | |
|---|---|---|
| JP | 2004-119139 A | 4/2004 |
| JP | 2004-241236 A | 8/2004 |
| JP | 2005-108674 A | 4/2005 |
| JP | 2005-285614 A | 10/2005 |
| WO | WO 02/27342 A2 | 4/2002 |
| WO | WO 03/098769 A | 11/2003 |
| WO | WO 2004/102708 A2 | 11/2004 |

\* cited by examiner

| | FC TEMPERATURE (°C) | | | |
|---|---|---|---|---|
| | T1 | T2 | T3 | ------ |
| I1 | IPD11 | IPD12 | IPD13 | ------ |
| I2 | IPD21 | IPD22 | IPD23 | ------ |
| I3 | IPD31 | IPD32 | IPD33 | ------ |
| ⋮ | ⋮ | ⋮ | ⋮ | ------ |

FC CURRENT (A)

FIG.5

FUEL CELL SYSTEM WHICH MEASURES IMPEDANCE

This is a 371 national phase application of PCT/JP2006/313516 filed 30 Jun. 2006, which claims priority of Japanese Patent Application No. 2005-191397 filed 30 Jun. 2005, the contents of which are incorporated herein by reference.

TECHNICAL FIELD

The present invention relates to a fuel cell system. More particularly, it relates to a fuel cell system which measures an impedance by use of an alternating-current impedance process.

BACKGROUND ART

In a fuel cell system, a fuel cell of a solid polymer type including a solid polymer film having proton conductivity in an electrolytic layer is mounted. When the solid polymer film of this fuel cell is in a wetted state, the film exhibits high proton conductivity, so that it is important to keep the solid polymer film in the wetted state in order to efficiently generate a power. In order to keep such a solid polymer film in the wetted state, a water exchange type humidifier (hereinafter referred to simply as the "humidifier") is utilized which performs water exchange between an oxidizing off gas to be discharged from a cathode side of the fuel cell and an oxidizing gas to be supplied to the cathode side of the fuel cell via a water vapor transmission film.

Here, it is known that an internal resistance of the fuel cell influences wettability of the electrolytic film in the fuel cell. When the fuel cell has a small internal water content and the electrolytic film dries (so-called dry-up), the internal resistance increases, and an output voltage of the fuel cell drops. On the other hand, when the fuel cell includes an excessively large internal water content (so-called flooding), electrodes of the fuel cell are covered with the water content, and the output voltage drops.

As a method of efficiently operating such a fuel cell, a method is proposed in which a cell voltage of the fuel cell is monitored, and an amount of an oxidizing gas to be supplied is controlled based on a measured value of the cell voltage (e.g., see the following patent document 1).

[Patent Document 1] Japanese Patent Application Laid-Open No. 2004-119139

DISCLOSURE OF THE INVENTION

However, a change of an internal water content of a fuel cell is slowly developed as a fluctuation of a cell voltage. Therefore, when the fluctuation of the cell voltage is actually detected and then an amount of an oxidizing gas is determined, a certain abnormality (dry-up, flooding or the like) might be generated in an electrolytic film, and there has been a problem that it is difficult to realize a highly efficient and stable operation.

The present invention has been developed in view of the above-mentioned situation, and an object thereof is to provide a fuel cell system in which the highly efficient and stable operation can be realized.

To solve the above-mentioned problem, a fuel cell system according to the present invention comprises: measurement means for measuring an impedance of a fuel cell in a predetermined frequency region; and regulation means for regulating an amount of a gas to be supplied to the fuel cell based on a measured value of the impedance in the predetermined frequency region.

According to such a constitution, the impedance of the fuel cell in the predetermined frequency region (e.g., a low frequency region) is measured, and the amount of the gas (e.g., an amount of an oxidizing gas) to be supplied to the fuel cell is regulated based on this measured value of the impedance. Here, since the impedance of the fuel cell in the predetermined frequency region largely differs with a fuel supply state (see FIG. 2), the amount of the gas to be supplied to the fuel cell is regulated based on such a measured value of the impedance, whereby the highly efficient and stable operation can be realized.

Here, it is preferable that the above-mentioned constitution further comprises storage means for storing an optimum impedance adapted value in the predetermined frequency region based on an operation state of the fuel cell and that the regulation means compares the measured value of the impedance with the impedance adapted value to regulate the amount of the gas to be supplied to the fuel cell based on a comparison result. It is also preferable that the optimum impedance adapted value in the predetermined frequency region based on a voltage and a temperature of the fuel cell is stored in the storage means. It is further preferable that the predetermined frequency region is a low frequency region of 10 Hz or less. It is further preferable that the gas to be supplied to the fuel cell is an oxidizing gas or a fuel gas. It is further preferable that the system further comprises a voltage conversion device inserted in a discharge path of the fuel cell and that the measurement means superimposes a signal for impedance measurement on an output target voltage of the voltage conversion device to measure the impedance of the fuel cell based on the signal for impedance measurement which has passed through the voltage conversion device.

As described above, according to the present invention, the highly efficient and stable operation of the fuel cell system can be realized.

BEST MODE FOR CARRYING OUT THE INVENTION

An embodiment of the present invention will hereinafter be described with reference to the drawings.

A. Present Embodiment

A-1. Whole Constitution

Figure 1:
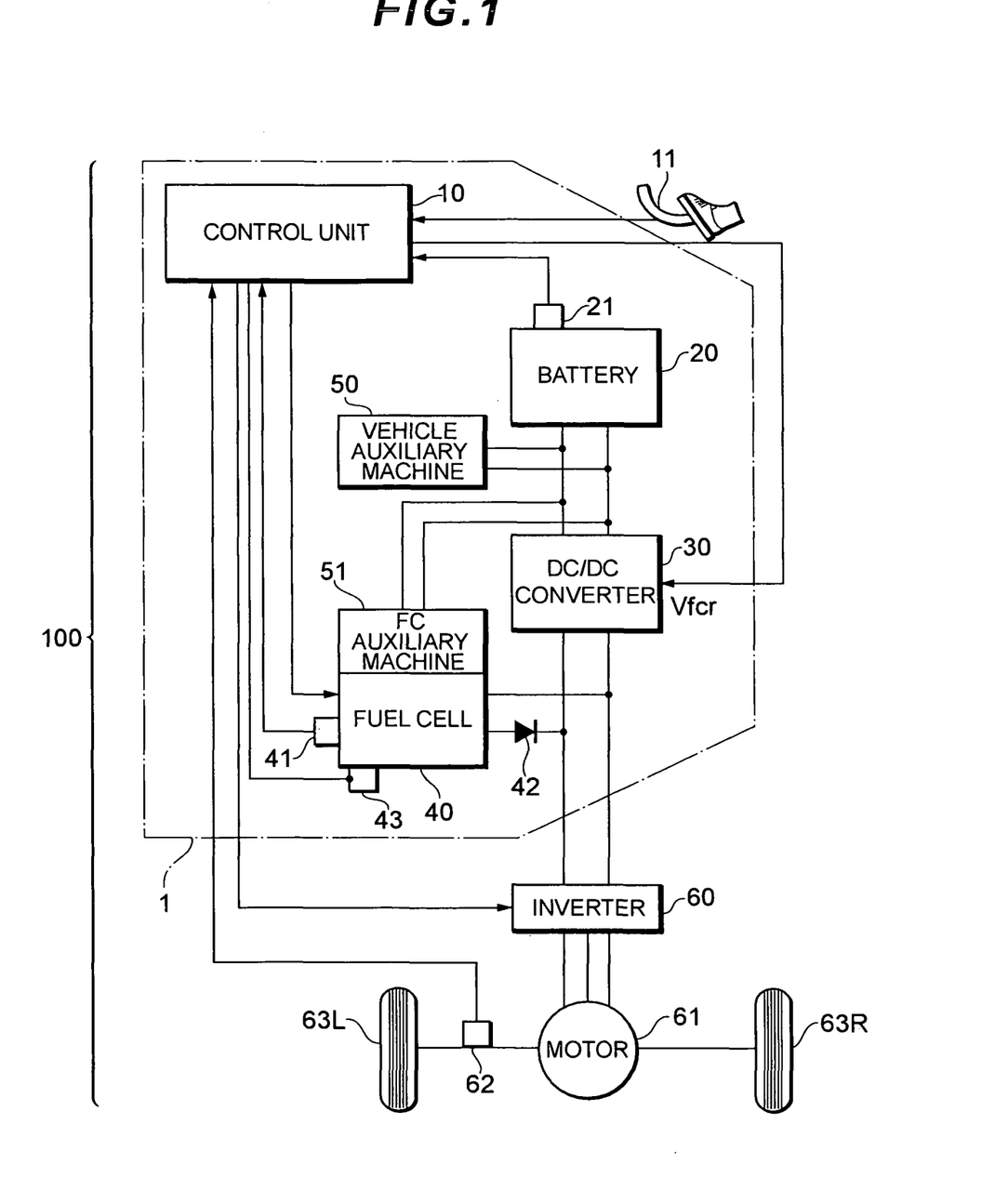
FIG. 1 is a diagram showing a constitution of a fuel cell system according to the present embodiment.

FIG. 1 is a schematic constitution diagram of a vehicle on which a fuel cell system 100 according to the present embodiment is mounted. It is to be noted that in the following description, a fuel cell hybrid vehicle (FCHV) is assumed as one example of a vehicle, but the present embodiment is also applicable to an electric car and a hybrid car. The embodiment is applicable to not only the vehicle but also various mobile bodies (e.g., a boat, an airplane, etc.).

This vehicle runs using a driving power source which is a synchronous motor 61 connected to wheels 63L, 63R. A power source of the synchronous motor 61 is a power supply system 1. A direct current output from the power supply system 1 is converted into a three-phase alternating current by an inverter 60, and supplied to the synchronous motor 61. The synchronous motor 61 can function as a power generator during braking.

The power supply system 1 is constituted of a fuel cell 40, a battery 20, a DC/DC converter 30 and the like. The fuel cell 40 is means for generating a power from the supplied fuel and oxidizing gases, and has a stacked structure in which a plurality of single cells including MEA and the like are laminated in series. Specifically, fuel cells of various types such as a solid polymer type, a phosphoric acid type and a dissolving carbonate type are usable.

The battery (an accumulator) 20 is a chargeable/dischargeable secondary battery constituted of, for example, a nickel hydrogen battery. Various other types of secondary batteries are applicable. Instead of the battery 20, a chargeable/dischargeable accumulator other than the secondary battery, for example, a capacitor may be used. This battery 20 is inserted in a discharge path of the fuel cell 40, and connected in parallel with the fuel cell 40.

The fuel cell 40 and the battery 20 are connected to the inverter 60 in parallel, and a circuit from the fuel cell 40 to the inverter 60 is provided with a diode 42 for preventing counter flow of the current from the battery 20 or the current generated in the synchronous motor 61.

Thus, to realize appropriate output distribution of both power sources of the fuel cell 40 and the battery 20 connected in parallel, a relative voltage difference between both the power sources needs to be controlled. To control such a voltage difference, the DC/DC converter (a voltage conversion device) 30 is disposed between the battery 20 and the inverter 60. The DC/DC converter 30 is a direct-current voltage converter, and has a function of regulating a DC voltage input from the battery 20 to output the voltage to a fuel cell 40 side, and a function of regulating the DC voltage input from the fuel cell 40 or the motor 61 to output the voltage to a battery 20 side. The functions of the DC/DC converter 30 realize charging/discharging of the battery 20.

A vehicle auxiliary machine 50 and an FC auxiliary machine 51 are connected between the battery 20 and the DC/DC converter 30, and the battery 20 is a power source of these auxiliary machines. The vehicle auxiliary machine 50 refers to various power devices for use during an operation of a vehicle and the like, and includes an illumination device, an air conditioning device, a hydraulic pump and the like. The FC auxiliary machine 51 refers to various power devices for use in an operation of the fuel cell 40, and includes a pump for supplying the fuel gas and a reforming material, a heater which regulates a temperature of a reformer and the like.

Operations of the above-mentioned elements are controlled by a control unit 10. The control unit 10 is constituted as a microcomputer including therein a CPU, an RAM and an ROM.

The control unit 10 controls switching of the inverter 60, and outputs a three-phase alternating current to the synchronous motor 61 based on a required power. The control unit 10 controls operations of the fuel cell 40 and the DC/DC converter 30 so as to supply the power corresponding to the required power. Various sensor signals are input into this control unit 10. For example, from an accelerator pedal sensor 11, an SOC sensor 21 which detects a state of charge (SOC) of the battery 20, a flow rate sensor 41 which detects a gas flow rate of the fuel cell 40, a temperature sensor 43 which detects an internal temperature (an FC temperature) of the fuel cell 40, a vehicle speed sensor 62 which detects a vehicle speed and the like, various sensor signals are input into the control unit 10. The control unit 10 measures an impedance of the fuel cell 40 by use of the respective sensor signals as follows.

A-2. Description of Impedance Measurement

Figure 2:
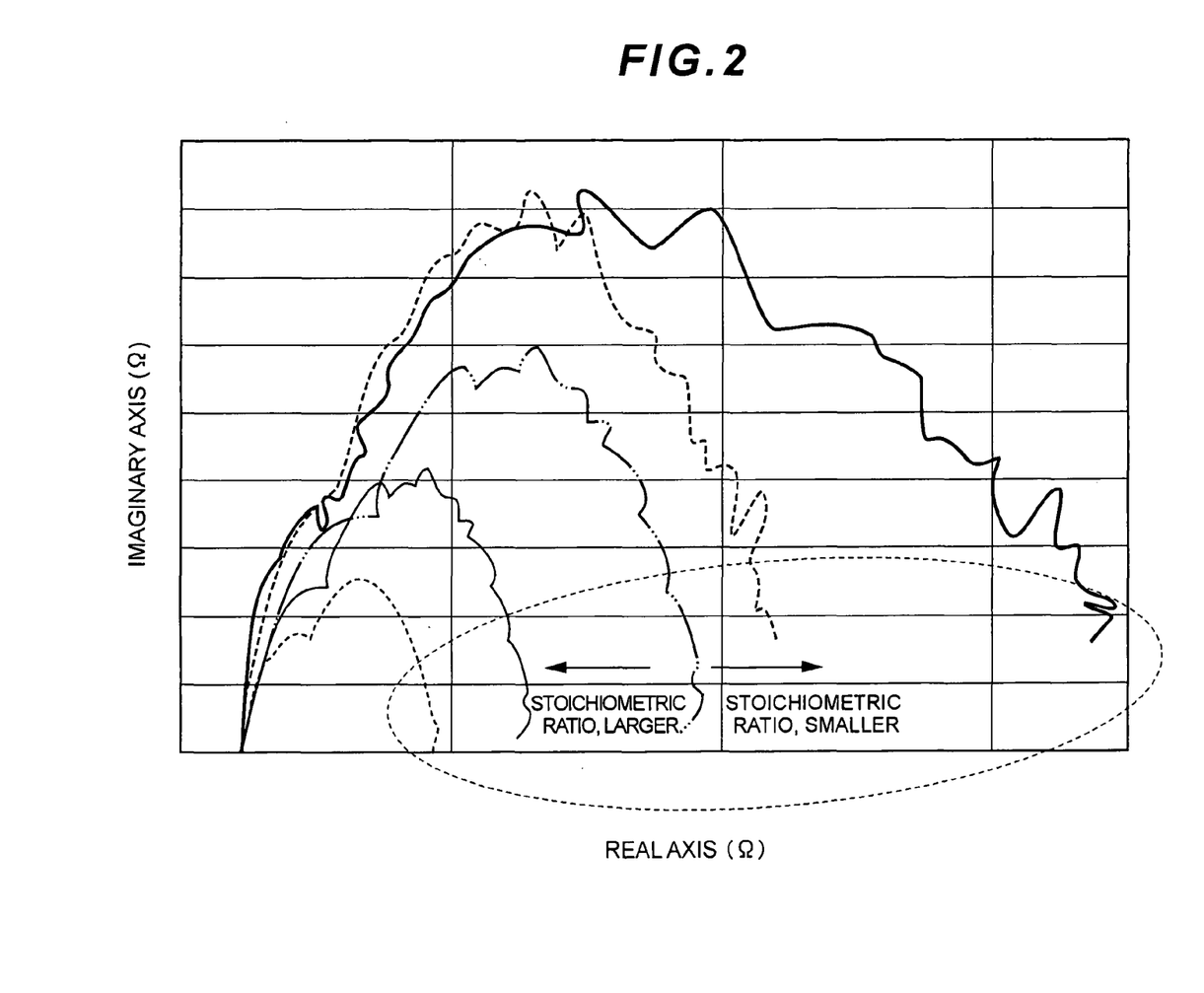
FIG. 2 is a diagram showing a result of impedance measurement according to the embodiment.

FIG. 2 is a diagram showing a result of impedance measurement by an alternating-current impedance process in a complex plane, and is a diagram showing the impedance measurement result at a time when an air stoichiometric ratio (a ratio of a total amount of an oxidizing gas including a surplus oxidizing gas with respect to a minimum oxidizing gas amount required for power generation in the fuel cell) is changed.

When a track of an impedance accompanying a frequency change is plotted (Cole-Cole plot) on the complex plane on predetermined conditions, an impedance curve is obtained as shown in FIG. 2. As shown in the drawing, it is seen that impedances of a low frequency region (e.g., a frequency of about 0.1 to 10 Hz) surrounded with a dot line largely differ with an air stoichiometric ratio (i.e., a fuel supply state to the fuel cell). In the present embodiment, the impedance in the low frequency region is measured using such a characteristic, and a flow rate of the oxidizing gas to be supplied to the fuel cell 40 is controlled based on the measured value, whereby a highly efficient and stable operation is realized. It is to be noted that the frequency region for use in the impedance measurement can be changed in accordance with system design or the like.

Figure 3:
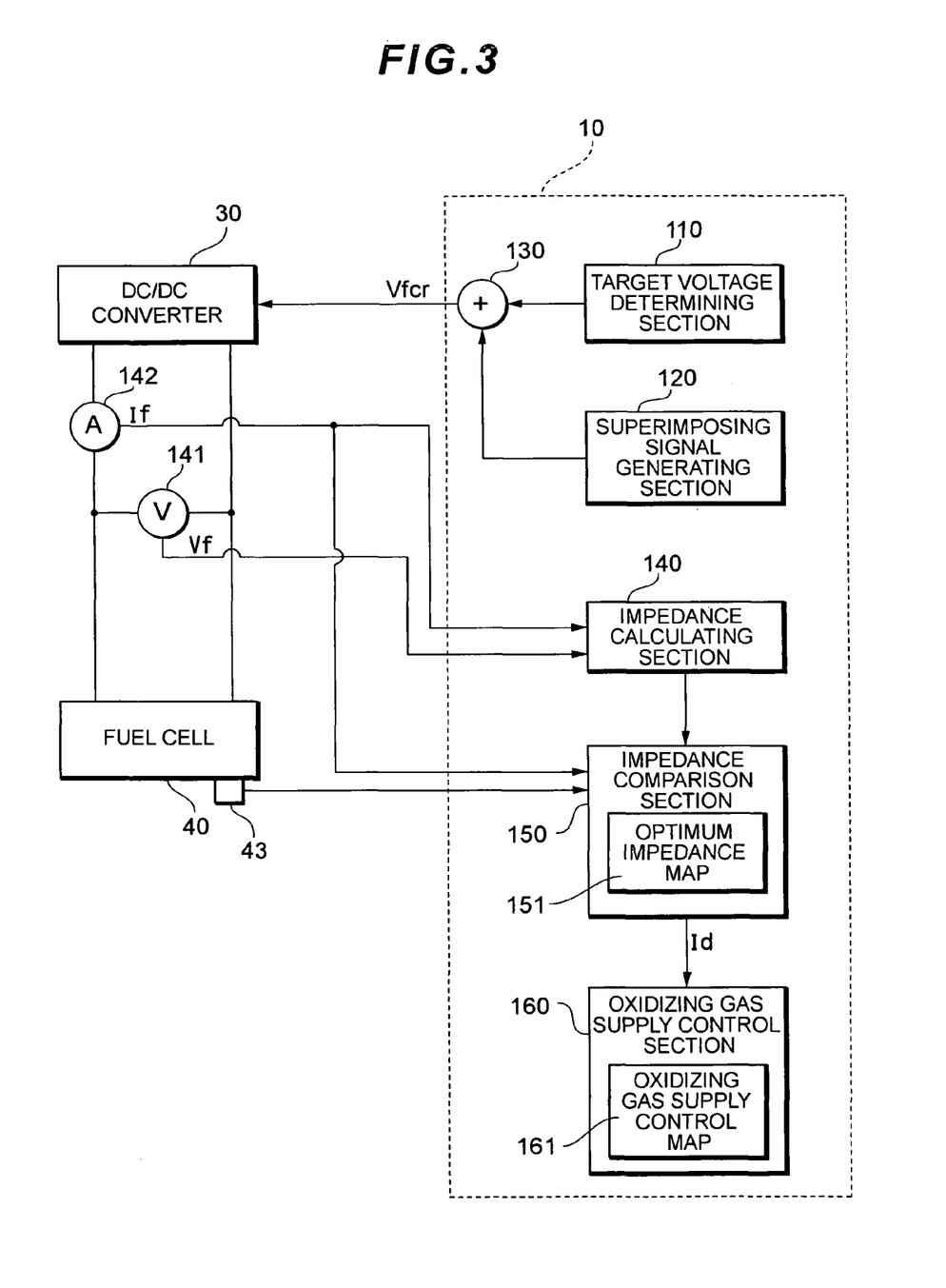
FIG. 3 is an explanatory view of functions of a control unit according to the embodiment.

FIG. 3 is an explanatory view of functions of the control unit 10.

As shown in FIG. 3, the control unit 10 includes a target voltage determining section 110, a superimposing signal generating section 120, a voltage instruction signal generating section 130, an impedance calculating section 140, an impedance comparison section 150, and an oxidizing gas supply control section 160.

The target voltage determining section 110 determines an output target voltage (e.g., 300 V or the like) based on the respective sensor signals input from the accelerator pedal sensor 11, the SOC sensor 21 and the like to output this voltage to the voltage instruction signal generating section 130.

The superimposing signal generating section 120 generates a signal for impedance measurement (e.g., a sine wave of the low frequency region with an amplitude value of 2 V or the like) which is to be superimposed on the output target voltage to output this signal to the voltage instruction signal generating section 130. It is to be noted that parameters (a type of a waveform, a frequency and an amplitude value) of the output target voltage and the signal for impedance measurement may appropriately be set in accordance with the system design and the like.

The voltage instruction signal generating section 130 superimposes the signal for impedance measurement on the output target voltage to output a voltage instruction signal Vfcr to the DC/DC converter 30. The DC/DC converter 30 controls the voltage of the fuel cell 30 or the like based on the applied voltage instruction signal Vfcr.

The impedance calculating section (measurement means) 140 samples a voltage (FC voltage) Vf of the fuel cell 40 which is detected by a voltage sensor 141 and a current (FC current) If of the fuel cell 40 which is detected by a current sensor 142 at a predetermined sampling rate to perform Fourier transform processing (FFT calculation processing and DFT calculation processing) and the like. The impedance calculating section 140 divides an FC voltage signal subjected to the Fourier conversion processing by an FC current signal subjected to the Fourier conversion processing to obtain the impedance of the fuel cell 40 in the low frequency region, and outputs the impedance to the impedance comparison section 150.

Figure 4:
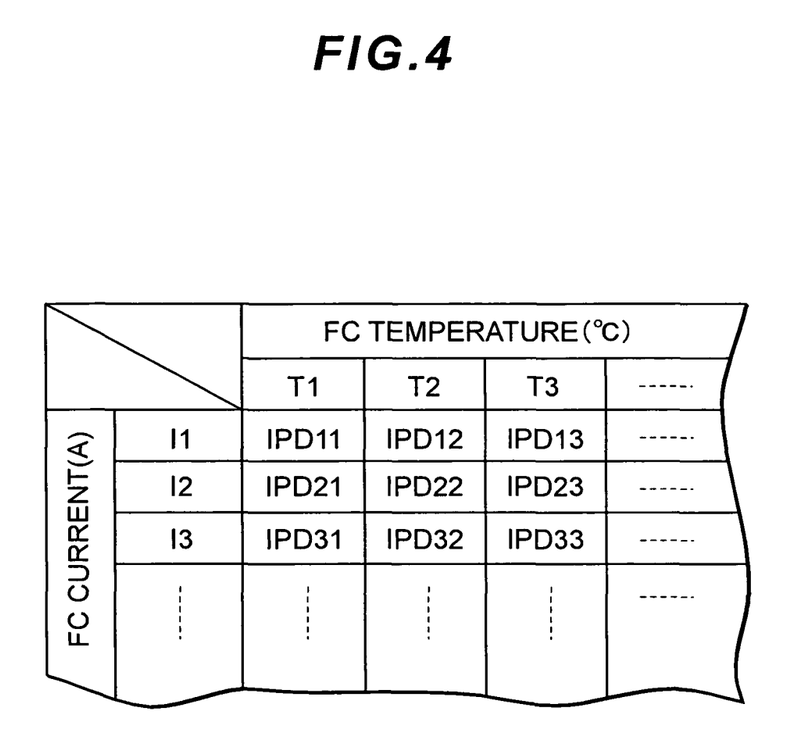
FIG. 4 is a diagram illustrating an optimum impedance map according to the embodiment.

On receiving an impedance (hereinafter referred to as a low frequency impedance measured value) of the fuel cell 40 in the low frequency region from the impedance calculating section 140, the impedance comparison section 150 refers to an optimum impedance map stored in a memory 151. FIG. 4 is a diagram illustrating the optimum impedance map. The optimum impedance map is a map having axes of the FC current and FC temperature, and is a map for uniquely determining an optimum impedance IPD from an FC current I and an FC temperature T. This optimum impedance map is prepared beforehand by an experiment or the like.

On receiving the low frequency impedance measured value from the impedance calculating section 140, the impedance comparison section 150 determines the optimum impedance IPD at the corresponding time based on the FC temperature T and the FC current I detected by the temperature sensor 43 and the current sensor 142, respectively. The impedance comparison section 150 obtains a difference between the determined optimum impedance IPD and the low frequency impedance measured value, and supplies the obtained difference as an impedance difference signal Id to the oxidizing gas supply control section 160.

The oxidizing gas supply control section (regulation means) 160 compares the impedance difference signal Id with an oxidizing gas supply control map stored in a memory 161 to control an amount of the oxidizing gas to be supplied to the fuel cell 40. In the oxidizing gas supply control map, the impedance difference signal Id and a correction amount (a correction amount of the air stoichiometric ratio or the like) of the oxidizing gas to be supplied to the fuel cell 40 are associated with each other and registered. When the oxidizing gas supply control section 160 obtains the correction amount of the oxidizing gas to be supplied to the fuel cell 40 based on the impedance difference signal Id, the section regulates a rotation number of an air compressor (not shown), a valve open degree of a control valve (not shown) disposed in an oxidizing gas supply passage and the like based on such a correction amount to control the amount of the oxidizing gas to be supplied to the fuel cell 40. Under such control, the optimum air stoichiometric ratio can constantly be traced, so that a highly efficient and stable system operation can be achieved.

B. Modification

In the present embodiment described above, the amount of the oxidizing gas to be supplied to the cathode side of the fuel cell 40 has been controlled using the measured value of the low frequency impedance, but an amount of a fuel gas to be supplied to an anode side of the fuel cell 40 may be controlled.

Figure 5:
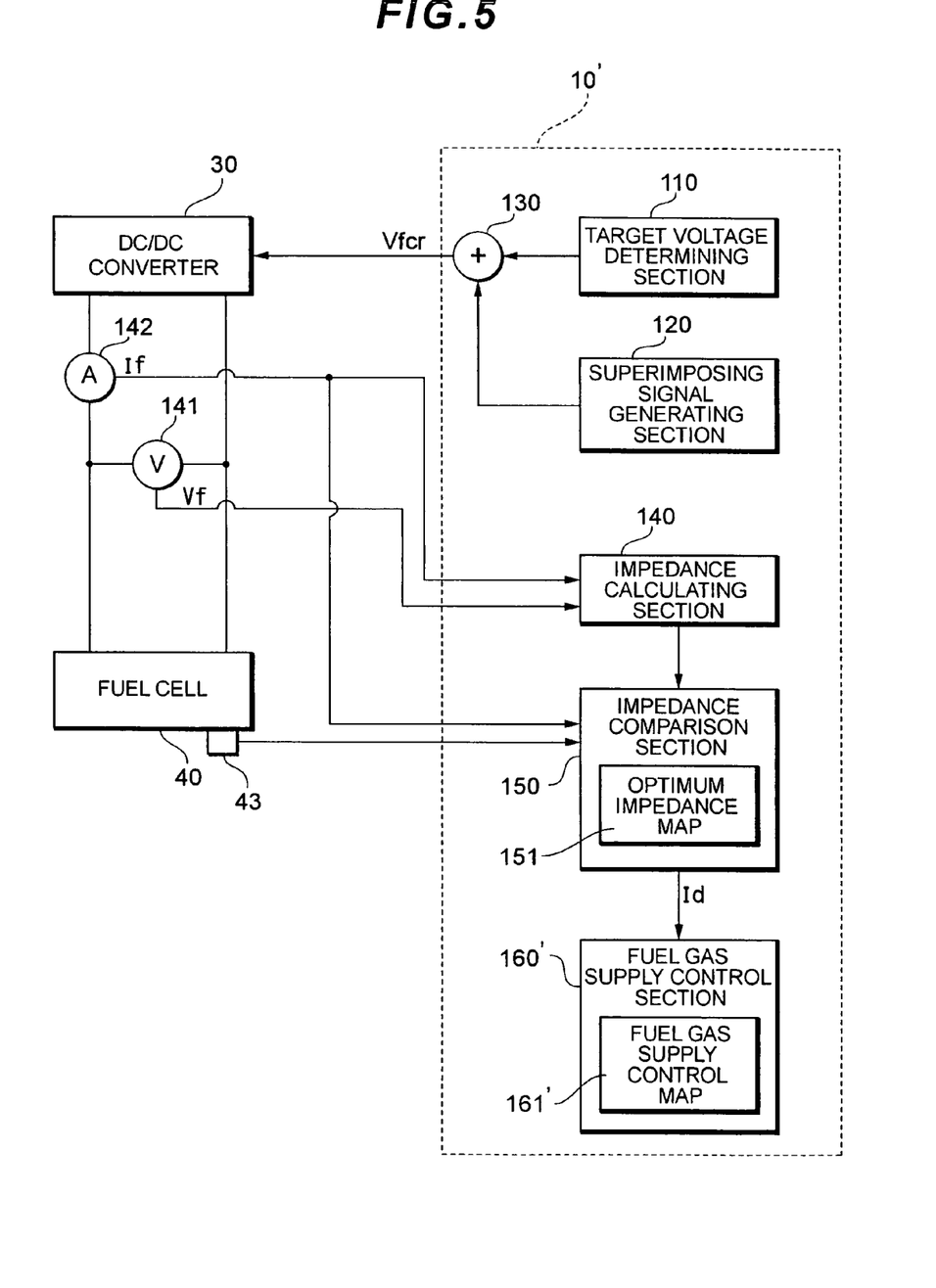
FIG. 5 is an explanatory view of functions of a control unit according to a second embodiment.

FIG. 5 is an explanatory view of functions of a control unit 10'.

The control unit 10' shown in FIG. 5 is provided with a fuel gas supply control section (regulation means) 160' instead of the oxidizing gas supply control section 160 shown in FIG. 3. The fuel gas supply control section 160' compares an impedance difference signal Id supplied from an impedance calculating section 140 with a fuel gas supply control map stored in a memory 161' to control the amount of the fuel gas to be supplied to a fuel cell 40. In the fuel gas control map, the impedance difference signal Id and a correction amount (a correction amount of a hydrogen stoichiometric ratio or the like) of the fuel gas to be supplied to the fuel cell 40 are associated with each other and registered. When the fuel gas supply control section 160' obtains the correction amount of the fuel gas to be supplied to the fuel cell 40 based on the impedance difference signal Id, the section regulates valve open degrees of a control valve (not shown) and a purge valve (not shown) disposed in a fuel gas supply passage and a fuel gas discharge passage and the like based on such a correction amount to control the amount of the fuel gas to be supplied to the fuel cell 40. Under such control, an optimum hydrogen stoichiometric ratio can constantly be traced, so that a highly efficient and stable system operation can be achieved. It is to be noted that a constitution according to the present embodiment and a constitution according to the modification may be combined to control the amounts of the oxidizing gas and the fuel gas to be supplied to the fuel cell 40 and to realize the highly efficient and stable system operation.

The invention claimed is:

1. A fuel cell system, comprising:
   a measurement system for determining an impedance of a fuel cell in a predetermined frequency region;
   a storage system for storing a plurality of optimum impedance adapted values in the predetermined frequency region based on output currents and temperatures of the fuel cell;
   a determination system programmed to determine an optimum impedance adapted value from the plurality of impedance adapted values stored in the storage system based on a detected output current and temperature; and
   a regulation system programmed to regulate an amount of a gas to be supplied to the fuel cell so that the measured value of the impedance is adjusted to the determined value of the impedance in the predetermined frequency region
   wherein the predetermined frequency region is a low frequency region of 10 Hz or less.

2. The fuel cell system according to claim 1, wherein the gas to be supplied to the fuel cell is an oxidizing gas or a fuel gas.

3. A fuel cell system, comprising:
   a measurement system for determining a impedance value of a fuel cell in a predetermined frequency region;
   a determination system programmed to determine an optimum impedance adapted value from a plurality of impedance adapted values based on a detected output current and temperature;
   a regulation system programmed to regulate an amount of a gas to be supplied to the fuel cell so that the measured value of the impedance is adjusted to the determined value of the impedance in the predetermined frequency region; and
   a voltage conversion system inserted in a discharge path of the fuel cell,
   wherein the measurement system is further programmed to superimposes a signal for impedance measurement on an output target voltage of the voltage conversion system to determine the impedance value of the fuel cell based on the signal for impedance measurement which has passed through the voltage conversion system
   wherein the predetermined frequency region is a low frequency region of 10 Hz or less.

4. The fuel cell system according to claim 3, further comprising:
   a storage system for storing an optimum impedance adapted value in the predetermined frequency region based on an operation state of the fuel cell,
   wherein the regulation system is programmed to compare the determined value of the impedance with the optimum impedance adapted value to regulate the amount of the gas to be supplied to the fuel cell based on a comparison result.

5. The fuel cell system according to claim 4, wherein the optimum impedance adapted value in the predetermined frequency region based on a voltage and a temperature of the fuel cell is stored in the storage system.

6. The fuel cell system according to claim 3, wherein the gas to be supplied to the fuel cell is an oxidizing gas or a fuel gas.

* * * * *

UNITED STATES PATENT AND TRADEMARK OFFICE
CERTIFICATE OF CORRECTION

PATENT NO.        : 8,603,689 B2                                          Page 1 of 1
APPLICATION NO. : 11/922892
DATED             : December 10, 2013
INVENTOR(S)       : Manabe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1152 days.

Signed and Sealed this
Twenty-second Day of September, 2015

Michelle K. Lee
*Director of the United States Patent and Trademark Office*